(12) United States Patent
Ootsuka

(10) Patent No.: US 9,627,667 B2
(45) Date of Patent: Apr. 18, 2017

(54) LID INCLUDING RIB ADJACENT SAFETY VALVE FOR A BATTERY CASE

(75) Inventor: Masato Ootsuka, Osaka (JP)

(73) Assignee: NISSHIN STEEL CO., LTD. (JP)

( * ) Notice: Subject to any disclaimer, the term of this patent is extended or adjusted under 35 U.S.C. 154(b) by 307 days.

(21) Appl. No.: 14/237,531

(22) PCT Filed: Aug. 3, 2012

(86) PCT No.: PCT/JP2012/069831
§ 371 (c)(1),
(2), (4) Date: Feb. 6, 2014

(87) PCT Pub. No.: WO2013/021939
PCT Pub. Date: Feb. 14, 2013

(65) Prior Publication Data
US 2014/0220395 A1  Aug. 7, 2014

(30) Foreign Application Priority Data

Aug. 9, 2011 (JP) .................. 2011-173632
Jun. 28, 2012 (JP) .................. 2012-144980

(51) Int. Cl.
*H01M 2/02* (2006.01)
*H01M 2/04* (2006.01)
*H01M 2/12* (2006.01)

(52) U.S. Cl.
CPC .......... *H01M 2/1241* (2013.01); *H01M 2/04* (2013.01); *H01M 2/0473* (2013.01); *H01M 2/0486* (2013.01); *H01M 2/0426* (2013.01)

(58) Field of Classification Search
CPC .... H01M 2/0473; H01M 2/1241; H01M 2/04; H01M 2/0486; H01M 2/0426

USPC .......................................... 429/56, 175, 176
See application file for complete search history.

(56) References Cited

U.S. PATENT DOCUMENTS 6,132,900 A * 10/2000 Yoshizawa .......... H01M 2/0426
29/623.1
2009/0263703 A1* 10/2009 Kim ..................... H01M 2/0404
429/53
2011/0206957 A1* 8/2011 Byun .................... H01M 2/043
429/56

FOREIGN PATENT DOCUMENTS

| EP | 2 104 159 A1 | 9/2009 |
|---|---|---|
| JP | 2000-285892 A | 10/2000 |
| JP | 2002-008616 A | 1/2002 |
| JP | 2002-170595 A | 6/2002 |
| JP | 2003-187760 A | 7/2003 |
| JP | 2005-332700 A | 12/2005 |
| JP | 2005332700 A * | 12/2005 |
| JP | 2006-351234 A | 12/2006 |

(Continued)

OTHER PUBLICATIONS

Takagi et al., Machine translation of JP 2005-332700 A, Dec. 2005.*
(Continued)

*Primary Examiner* — Sean P Cullen
(74) *Attorney, Agent, or Firm* — Fitch Even Tabin & Flannery LLP

(57) ABSTRACT

In a lid for a battery case where an annular thin portion is formed integrally with a lid main body by coining, a pair of ribs formed integrally with the lid main body so as to bulge from the lid main body and extending in a short direction of the lid main body are disposed on both sides of the annular thin portion in a long direction of the lid main body.

8 Claims, 4 Drawing Sheets

(56) References Cited

FOREIGN PATENT DOCUMENTS

| JP | 2007-141518 A | 6/2007 |
| JP | 2007-179793 A | 7/2007 |
| JP | 2008-251438 A | 10/2008 |

OTHER PUBLICATIONS

Shimoji et al., Machine translation of JP 2007-141518 A, Jun. 2007.*
European Search Report for European Application No. 12821973.0 dated Mar. 6, 2015 (9 pages).
International Search Report from the International Bureau of WIPO for International Application No. PCT/JP2012/069831 dated Sep. 25, 2012 (4 pages).

* cited by examiner

LID INCLUDING RIB ADJACENT SAFETY VALVE FOR A BATTERY CASE

CROSS-REFERENCE TO RELATED APPLICATIONS

This application is a U.S. national phase application filed under 35 U.S.C. §371 of International Application PCT/JP2012/069831, filed on Aug. 3, 2012, designating the United States, which claims priority from Japanese Application Number 2011-173632, filed Aug. 9, 2011, and Japanese Application Number 2012-144980, filed Jun. 28, 2012, which are hereby incorporated herein by reference in their entirety.

TECHNICAL FIELD

The present invention relates to a lid for a battery case that is formed from a metallic sheet and constitutes a battery case of a battery, and more particularly to a novel improvement according to which either a pair of ribs are provided on both sides of an annular thin portion or the annular thin portion is provided between a short side of a lid main body and a rib, whereby excessive stress concentration in a part of the annular thin portion can be avoided and a safety valve can be ruptured more reliably.

BACKGROUND ART

A configuration disclosed in Japanese Patent Application Publication No. 2000-285892 A and so on, may be cited as a conventionally employed battery case lid of this type. FIG. 8 is an exploded perspective view showing a battery case using a conventional lid. In the drawing, a lid 1 constitutes a battery case 3 together with a case main body 2 having a closed-end tube shape. The lid 1 and the case main body 2 are formed from metallic sheet made of aluminum, an aluminum alloy, nickel-plated steel, stainless steel, or the like. The lid 1 is provided with a lid main body 4 and a safety valve 5. The lid main body 4 is a planar portion formed in a rectangular shape having a short side 40 and a long side 41 when seen from above. The safety valve 5 is provided to prevent the battery case 3 from bursting open when an internal pressure of the battery case 3 (referred to hereafter as internal case pressure) rises. When the internal pressure of the battery case 3 exceeds a predetermined value, the safety valve 5 ruptures, thereby releasing the internal pressure of the battery case 3 to the outside. The safety valve 5 includes an annular thin portion 50 formed integrally with the lid main body 4 by performing coining (pressing) in which an engraving punch is pressed against the metallic sheet serving as a base material of the lid 1. When the internal pressure of the battery case 3 exceeds the predetermined value, all or a majority of the annular thin portion 50 fractures, thereby rupturing the safety valve 5.

The inventors of the present application discovered, while repeatedly manufacturing prototypes of the battery case 3 described above and testing operation of the safety valve 5, that when coining is used to form the annular thin portion 50 integrally with the lid main body 4 made of metallic sheet, a unique problem occurs.

FIG. 9 is an illustrative view showing deformation of the lid 1 shown in FIG. 8 when the internal case pressure rises. As shown in FIG. 9, when the internal case pressure rises, the lid main body 4 of the lid 1 deforms in an arc shape such that a ridge 4c extending in a long direction 4b of the lid main body 4 is formed substantially centrally in a short direction 4a of the lid main body 4. As a result, tensile stress acting on the annular thin portion 50 of the safety valve 5 disposed in a central portion of the lid main body 4 is greater in the short direction than in the long direction. Meanwhile, an inner peripheral region of the annular thin portion 50 is increased in thickness by the coining process, and therefore, when the internal case pressure rises, the inner peripheral region of the annular thin portion 50 deforms more slowly than the entire lid main body 4. As a result, excessive stress is concentrated in a part (a part on the long side 41 side of the lid main body 4) of the annular thin portion 50 removed from the ridge 4c.

When the stress acting on the annular thin portion 50 is excessively concentrated in a part of the annular thin portion 50, only this part fractures. In this case, the internal pressure of the battery case 3 escapes through the fractured part, and therefore the safety valve 5 cannot rupture normally. As a result, the speed at which the internal case pressure is released decreases (this condition is termed as a slow leak). In other words, with the conventional configuration described above, no measures are taken to avoid stress concentration accompanying deformation of the lid main body 4 when the internal case pressure rises, and as a result, the safety valve 5 may be unable to rupture normally.

SUMMARY OF THE INVENTION

The present invention has been designed to solve the problem described above, and an object thereof is to provide a lid for a battery case with which excessive stress concentration in a part of an annular thin portion can be avoided so that a safety valve can be ruptured more reliably.

A lid for a battery case according to the present invention, which is formed from a metallic sheet and constitutes a battery case, includes: a lid main body that is formed in a rectangular shape having a short side and a long side when seen from above; a safety valve that includes an annular thin portion formed integrally with the lid main body by coining, and ruptures when an internal pressure of the battery case exceeds a predetermined value, thereby releasing the internal pressure of the battery case to the outside; and a pair of ribs formed integrally with the lid main body so as to bulge from the lid main body, extending in a short direction of the lid main body, and disposed on both sides of the annular thin portion in a long direction of the lid main body.

Further, a lid for a battery case that is formed from a metallic sheet and constitutes a battery case includes: a lid main body that is formed in a rectangular shape having a short side and a long side when seen from above; and a safety valve that includes an annular thin portion formed integrally with the lid main body by coining, and ruptures when an internal pressure of the battery case exceeds a predetermined value, thereby releasing the internal pressure of the battery case to the outside, wherein the short side includes mutually opposing first and second short sides, the annular thin portion is disposed in a position that is closer to the second short side than the first short side, and the second short side and a rib that is formed integrally with the lid main body so as to bulge from the lid main body and extends in a short direction of the lid main body are disposed on both sides of the annular thin portion in a long direction of the lid main body.

With the lid for a battery case according to the present invention, either the pair of ribs extending in the short direction of the lid main body or the short side of the lid main body and the rib are disposed on both sides of the annular thin portion in the long direction of the lid main body, and therefore deformation in a peripheral region of the annular thin portion can be suppressed when the internal pressure of the case rises. Accordingly, excessive stress concentration in a part of the annular thin portion can be avoided, and as a result, the safety valve can be ruptured more reliably.

DETAILED DESCRIPTION OF THE PREFERRED EMBODIMENTS

Embodiments of the present invention will be described below with reference to the drawings.

First Embodiment

Figure 1:
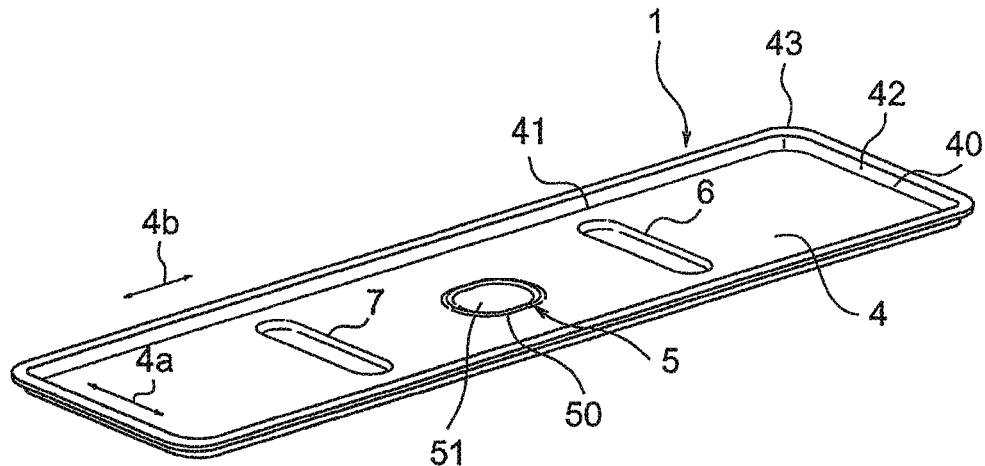
FIG. 1 is a perspective view showing a lid for a battery case according to a first embodiment of the present invention.
Figure 2:
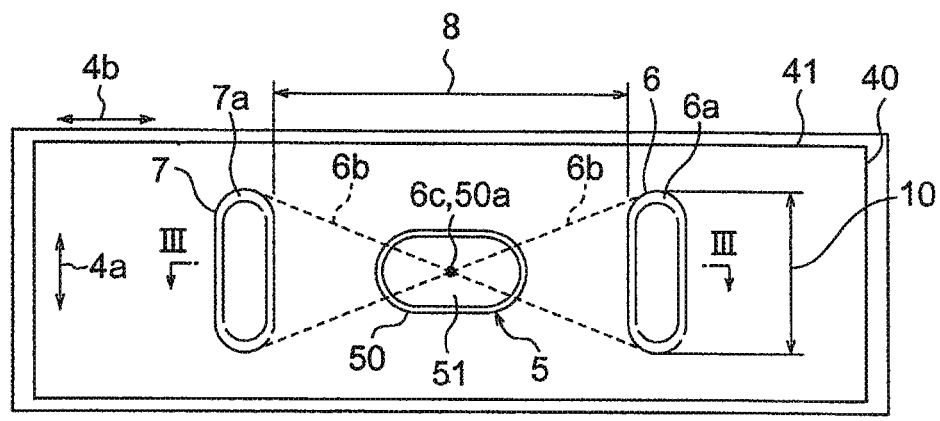
FIG. 2 is a plan view showing the lid of FIG. 1.
Figure 3:
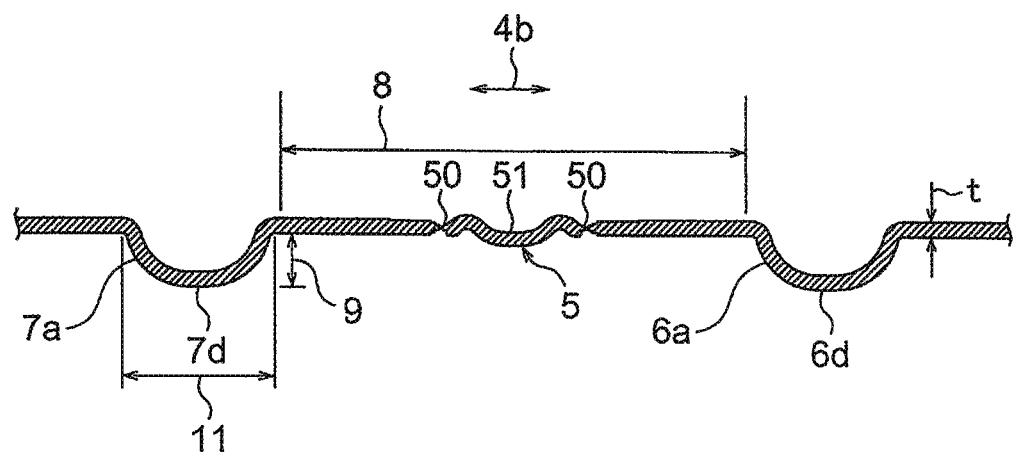
FIG. 3 is a sectional view taken along line III-III in FIG. 2.
Figure 8:
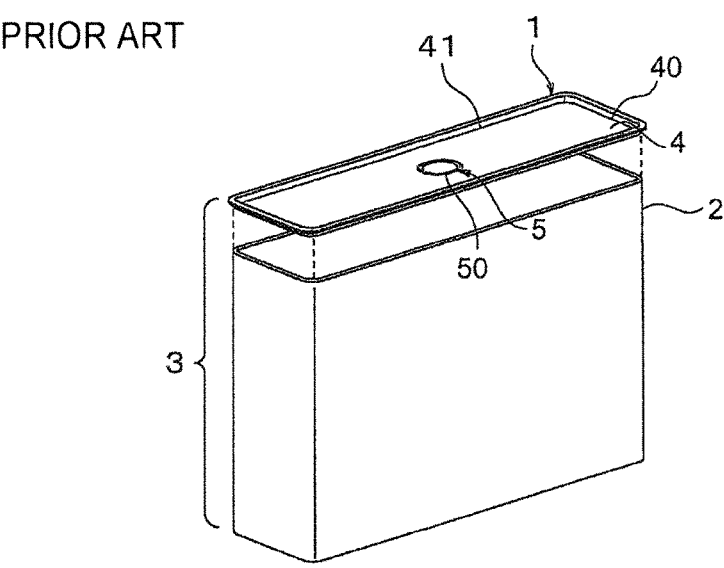
FIG. 8 is an exploded perspective view showing a battery case employing a conventional lid.

FIG. 1 is a perspective view showing a lid 1 for a battery case 3 according to a first embodiment of the present invention, FIG. 2 is a plan view showing the lid 1 of FIG. 1, and FIG. 3 is a sectional view taken along a line in FIG. 2. Note that identical or equivalent parts to the conventional battery case lid (see FIGS. 8 and 9) will be described using identical reference numerals. The lid 1 shown in FIG. 1 constitutes the battery case 3 (see FIG. 8), which is used to store an electrolyte in a battery such as a lithium ion battery together with the case main body 2 (see FIG. 8) having a closed-end tube shape. The entire lid 1 is formed from a metallic sheet made of stainless steel.

The lid 1 includes the lid main body 4, the safety valve 5, and a pair of ribs 6, 7. As shown in FIG. 2, the lid main body 4 is a substantially planar flat sheet portion formed in a rectangular shape having the short side 40 and the long side 41 when seen from above. A side wall portion 42 stands upright from an outer edge of the lid main body 4 in a sheet thickness direction of the lid main body 4. A flange portion 43 is bent substantially at a right angle from a tip end portion of the side wall portion 42.

The safety valve 5 includes the annular thin portion 50 and a bent portion 51. The annular thin portion 50 is an elliptical groove constituting an edge portion of the safety valve 5, and is formed integrally with the lid main body 4 by implementing coining in a plurality of stages on the metallic sheet serving as the base material of the lid 1. As shown in FIG. 3, the annular thin portion 50 is thinner than the remaining sheet surface of the lid 1 so that when the internal case pressure of the battery case 3 exceeds a predetermined value, the annular thin portion 50 fractures first, thereby causing the entire safety valve 5 to rupture. The bent portion 51 is a sheet portion on an inner peripheral side of the annular thin portion 50, which deforms so as to bend in the sheet thickness direction while absorbing excess thickness generated when the annular thin portion 50 is formed by coining (see FIG. 3).

Figure 9:
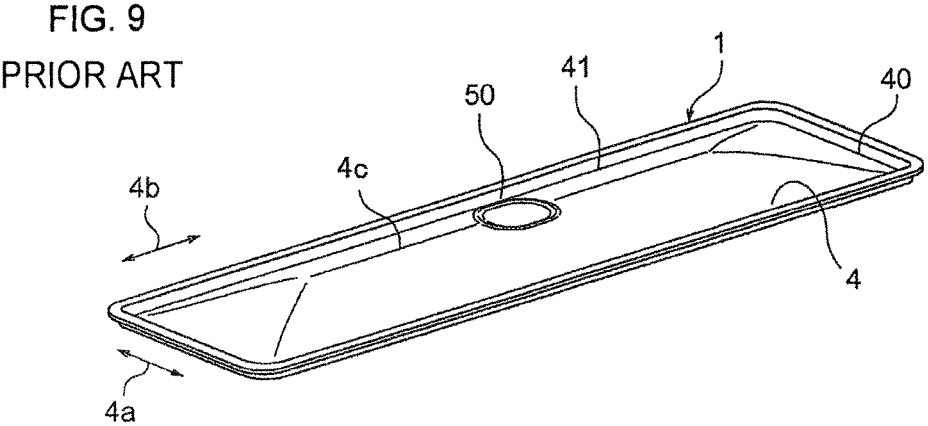
FIG. 9 is an illustrative view showing deformation of the lid shown in FIG. 8 when the internal case pressure rises.

Here, as with the conventional configuration, it may be impossible to ensure that the safety valve 5 ruptures normally if, following an increase in the internal case pressure (the internal pressure of the battery case 3), the entire lid main body 4 deforms in an arc shape such that the ridge 4c extending in the long direction 4b of the lid main body 4 is formed substantially centrally in the short direction 4a of the lid main body 4 (see FIG. 9). In this embodiment, however, the pair of ribs 6, 7 formed integrally with the lid main body 4 so as to bulge out from the lid main body 4 are disposed on both sides of the annular thin portion 50 in the long direction 4b of the lid main body 4, and therefore the safety valve 5 can be ruptured more reliably.

As shown in FIGS. 1 and 2, the ribs 6, 7 respectively extend in the short direction 4a of the lid main body 4. More specifically, as shown in FIG. 2, each rib 6, 7 is formed in a rectangular shape having rounded corner portions when seen from above. By providing the ribs 6, 7 to extend in the short direction 4a in this manner, rigidity against deformation of the lid main body 4 such as that shown in FIG. 9 can be obtained in a region between the ribs 6, 7, or the peripheral region of the annular thin portion 50.

A separation distance 8 between the ribs 6, 7 in the long direction 4b is set at no more than 3 W, where W is a length of the short side 40 of the lid main body 4. A rib height 9 (see FIG. 3) of the respective ribs 6, 7 in a sheet thickness direction of the lid main body 4 is set at no less than 1.25 t, where t is a sheet thickness of the lid main body 4. A rib length 10 (see FIG. 2) of the respective ribs 6, 7 in the short direction 4a is set at no less than 0.6 W. A rib width 11 (see FIG. 3) of the respective ribs 6, 7 in the long direction 4b is set at no less than 1 t. The significance of these dimensions will be illustrated in examples to be described below.

The separation distance 8 is a distance between adjacent sides of respective bulge base portions 6a, 7a of the ribs 6, 7. The rib height 9 is a height from the sheet surface of the lid main body 4 to an outer end surface of bulge apex portions 6d, 7d furthest removed from the sheet surface of the lid main body 4. The rib length 10 is a distance between respective ends of each bulge base portion 6a, 7a in the short direction 4a. The rib width 11 is a distance between respective ends of each bulge base portion 6a, 7a in the long direction 4b.

When the battery case 3 is formed from the lid 1 and the case main body 2, the ribs 6, 7 are formed to bulge toward an interior of the battery case 3. By forming the ribs 6, 7 to bulge in this direction, greater rigidity against stress acting on the ribs 6, 7 when the internal case pressure rises can be obtained.

In this embodiment, the annular thin portion 50 is formed in a point symmetrical shape and disposed such that a central position 50a (a center point) of the annular thin portion 50 is aligned with an intersection 6c between two line segments 6b linking respective end portions of the ribs 6, 7 (see FIG. 2). By aligning the intersection 6c between the line segments 6b with the central position 50a of the annular thin portion 50 in this manner, stress can be dispersed evenly over the entire annular thin portion 50 when the peripheral region of the annular thin portion 50 deforms.

Figure 4:
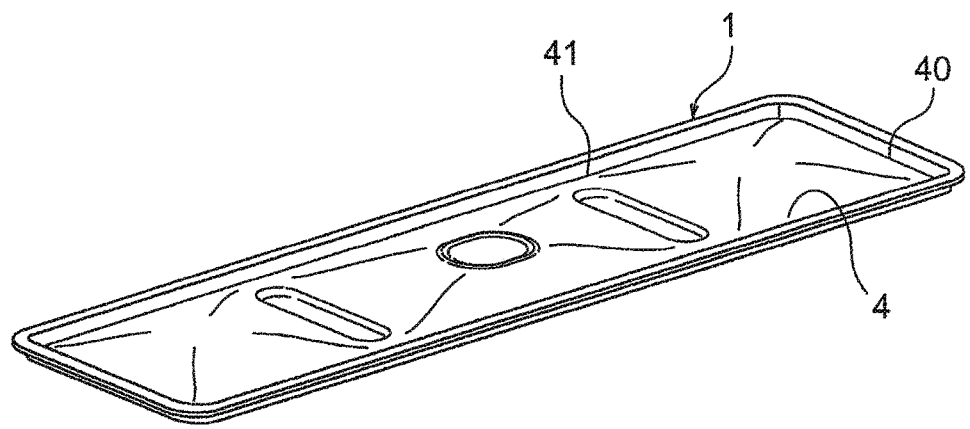
FIG. 4 is an illustrative view showing deformation of the lid shown in FIG. 1 when an internal case pressure rises.

Next, an action will be described. FIG. 4 is an illustrative view showing deformation of the lid 1 shown in FIG. 1 when the internal case pressure rises. As shown in FIG. 4, by providing the ribs 6, 7 on both sides of the annular thin portion 50, the deformation of the lid main body 4 occurring when the internal case pressure rises is separated by the ribs 6, 7. In comparison with the conventional configuration, therefore, deformation in the peripheral region of the annular thin portion 50 can be suppressed, with the result that excessive stress concentration in a part of the annular thin portion 50 accompanying deformation of the lid main body 4 following an increase in the internal case pressure can be avoided. Accordingly, partial fracturing of the annular thin portion 50 can be prevented, and as a result, the safety valve 5 can be ruptured more reliably.

Next, examples will be described. The present inventors manufactured the lid 1 shown in FIG. 1 using SUS 430 sheet having a thickness of 0.8 mm as a base material, and manufactured the battery case 3 by welding the lid 1 to the case main body 2. The long side 41 of the lid main body 4 was set at 160 mm, the short side 40 of the lid main body 4 was set at 40 mm, and an overall height of the battery case 3 was set at 100 mm. The annular thin portion 50 of the safety valve 5 was formed as a 10 mm×15 mm ellipse, and by implementing coining in multiple stages, the thickness of a thinnest portion of the annular thin portion 50 was set at 50 μm. The target range of the operating internal pressure of the safety valve 5 was set at 0.8 to 1.4 MPa.

The ribs 6, 7 were formed to bulge toward the interior of the battery case 3 in the positions shown in FIG. 1. The ribs 6, 7 were formed with a height of 2 mm, a width of 4 mm, a length of 32 mm, and a separation distance of 26 mm. The radius of the ends of the ribs 6, 7 was set at 2 R, and in consideration of formability, locations corresponding to a punch shoulder and a die shoulder of the rib 6 were set at half the rib height. Further, the battery case 3 using the conventional lid not provided with the ribs 6, 7 was manufactured for comparison.

After manufacturing the battery case 3 as described above, a hydraulic tester was connected to a bottom surface (a surface opposing the lid 1) of the battery case 3, whereupon pressure was applied to the interior of the battery case 3 without restraining the periphery of the battery case 3. Results of operating conditions and operating pressure of the safety valve 5 are shown below on Table 1. Note that the ruptured condition of the safety valve 5 was determined by sight.

TABLE 1

|  | Without ribs | With ribs |
|---|---|---|
| Operating pressure/MPa | 0.8 | 1.2 |
| Operating condition | Slow leak | Rupture |
|  | X(Not Acceptable) | ○(Acceptable) |

As shown on Table 1, in the battery case 3 using the conventional lid 1 not provided with the ribs 6, 7, a part of the annular thin portion 50 fractured upon application of a pressure of 0.8 MPa, causing a slow leak. In the battery case 3 using the lid 1 provided with the ribs 6, 7, on the other hand, it was confirmed that the safety valve 5 ruptured normally upon application of a pressure of 1.2 MPa.

Next, a similar test was performed after modifying only the separation distance 8 between the ribs 6, 7, from among the dimensions of the ribs 6, 7 described above, as shown below on Table 2.

TABLE 2

|  | No. 1 | No. 2 | No. 3 | No. 4 | No. 5 | No. 6 | No. 7 |
|---|---|---|---|---|---|---|---|
| Separation interval/mm | 26 | 40 | 60 | 80 | 100 | 120 | 140 |
| Ratio to short side W | 0.65 W | 1 W | 1.5 W | 2 W | 2.5 W | 3 W | 3.5 W |
| Operating pressure/MPa | 1.2 | 1.2 | 1.2 | 1.2 | 1.1 | 1.1 | 1.0 |
| Operating condition | Rupture ○ | Rupture ○ | Rupture ○ | Rupture ○ | Rupture ○ | Rupture ○ | Slow leak X |

As shown on Table 2, when the separation distance 8 was set at no more than 120 mm (i.e. when the separation distance 8 was set at no more than 3 W, where W is the length of the short side 40), it was confirmed that the safety valve 5 ruptured normally, but when the separation distance 8 was set at 140 mm (i.e. when the separation distance 8 was increased beyond 3 W), a part of the annular thin portion 50 fractured, causing a slow leak. The reason for this may be that when the separation distance 8 is large, deformation advances over a large region on the periphery of the annular thin portion 50 following an increase in the internal case pressure, and since the deformation in this region cannot be suppressed, the tensile stress acting on the annular thin portion 50 increases to a greater extent in the short direction than in the long direction, with the result that this stress cannot be dispersed evenly.

Next, a similar test was performed after modifying only the rib height 9, from among the dimensions of the ribs 6, 7 described above, as shown below on Table 3.

TABLE 3

|  | No. 1 | No. 2 | No. 3 | No. 4 | No. 5 |
|---|---|---|---|---|---|
| Height/mm | 0.8 | 1.0 | 1.2 | 1.6 | 2.0 |
| Ratio to sheet thickness t | 1 t | 1.25 t | 1.5 t | 2 t | 2.5 t |
| Operating pressure/MPa | 0.9 | 1.0 | 1.1 | 1.2 | 1.2 |
| Operating condition | Slow leak X | Rupture ○ | Rupture ○ | Rupture ○ | Rupture ○ |

As shown on Table 3, when the rib height 9 was set at no less than 1.0 mm (i.e. when the rib height 9 was set at no less than 1.25 t, where t is the thickness of the lid main body 4), it was confirmed that the safety valve 5 ruptured normally, but when the rib height 9 was set at 0.8 mm (i.e. when the rib height 9 was reduced below 1.25 t), a part of the annular thin portion 50 fractured, causing a slow leak. The reason for this may be that when the rib height 9 is small, the ribs 6, 7 cannot withstand the stress generated when the lid main body 4 deforms due to an increase in the internal case pressure, and therefore deformation in the peripheral region of the annular thin portion 50 cannot be suppressed.

Next, a similar test was performed after modifying only the rib length 10, from among the dimensions of the ribs 6, 7 described above, as shown below on Table 4.

TABLE 4

|  | No. 1 | No. 2 | No. 3 | No. 4 |
|---|---|---|---|---|
| Length/mm | 16 | 20 | 24 | 32 |
| Ratio to short side W | 0.4 W | 0.5 W | 0.6 W | 0.8 W |
| Operating pressure/MPa | 0.8 | 0.9 | 1.1 | 1.2 |
| Operating condition | Slow leak X | Slow leak X | Rupture ◯ | Rupture ◯ |

As shown on Table 4, when the rib length 10 was set at no less than 24 mm (i.e. when the rib length 10 was set at no less than 0.6 W, where W is the length of the short side 40), it was confirmed that the safety valve 5 ruptured normally, but when the rib length 10 was set at 20 mm and 16 mm (i.e. when the rib length 10 was reduced below 0.6 W), a part of the annular thin portion 50 fractured, causing a slow leak. The reason for this may be that when the rib length 10 is short, rigidity cannot be secured in the peripheral region of the annular thin portion 50, and therefore deformation in this region cannot be suppressed.

Next, a similar test was performed after modifying only the rib width 11, from among the dimensions of the ribs 6, 7 described above, as shown below on Table 5.

TABLE 5

|  | No. 1 | No. 2 | No. 3 | No. 4 | No. 5 | No. 6 |
|---|---|---|---|---|---|---|
| Width/mm | 0.6 | 0.8 | 2 | 4 | 20 | 50 |
| Ratio to sheet thickness t | 0.75 t | 1 t | 2.25 t | 5 t | 25 t | 62.5 t |
| Operating pressure/MPa | Not measured | 1.2 | 1.2 | 1.2 | 1.2 | 1.1 |
| Operating condition | Cracked during formation | Rupture ◯ | Rupture ◯ | Rupture ◯ | Rupture ◯ | Rupture ◯ |

As shown on Table 5, when the rib width 11 was set at no less than 0.8 mm (i.e. when the rib width 11 was set at no less than 1 t, where t is the thickness of the lid main body 4), the ribs 6, 7 were formed normally, and it was confirmed that the safety valve 5 ruptured normally. When the rib width 11 was set at 0.6 mm (i.e. when the rib width 11 was reduced below 1 t), however, cracking occurred in the ribs 6, 7 at the formation stage, and therefore the test could not be implemented. The reason for this may be that when the rib width 11 is too narrow, processing conditions during formation of the ribs 6, 7 become too strict.

In the lid 1 for the battery case 3, the pair of ribs 6, 7 extending in the short direction 4a of the lid main body 4 are disposed on both sides of the annular thin portion 50 in the long direction 4b of the lid main body 4, and therefore deformation in the peripheral region of the annular thin portion 50 can be suppressed when the internal case pressure rises. Accordingly, excessive stress concentration in a part of the annular thin portion 50 can be avoided, and as a result, the safety valve 5 can be ruptured more reliably. When the metallic sheet forming the lid 1 is made of stainless steel, it is difficult to ensure that the annular thin portion 50 ruptures with stability due to the great strength of stainless steel compared to aluminum and the like, but when the ribs 6, 7 are disposed on both sides of the annular thin portion 50, as in this embodiment, the safety valve 5 can be ruptured more reliably. In other words, the present invention is particularly effective in a case where the metallic sheet forming the lid 1 is made of stainless steel.

Further, the separation distance 8 between the ribs 6, 7 in the long direction 4b is set at no more than 3 W, where W is the length of the short side 40, the rib height 9 of the respective ribs 6, 7 in the sheet thickness direction of the lid main body 4 is set at no less than 1.25 t, where t is the sheet thickness of the lid main body 4, and the rib length 10 of the respective ribs 6, 7 in the short direction 4a is set at no less than 0.6 W. Hence, excessive stress concentration in a part of the annular thin portion 50 can be avoided more reliably, and as a result, the safety valve 5 can be ruptured even more reliably.

Furthermore, the rib width 11 of the respective ribs 6, 7 in the long direction 4b is set at no less than 1 t, and therefore cracking at the formation stage of the ribs 6, 7 can be avoided more reliably.

Moreover, the ribs 6, 7 are formed to bulge into the interior of the battery case 3 from the lid main body 4, and therefore greater rigidity against the stress that acts on the ribs 6, 7 when the internal case pressure rises can be obtained, with the result that excessive stress concentration in a part of the annular thin portion 50 can be avoided even more reliably.

Second Embodiment

Figure 5:
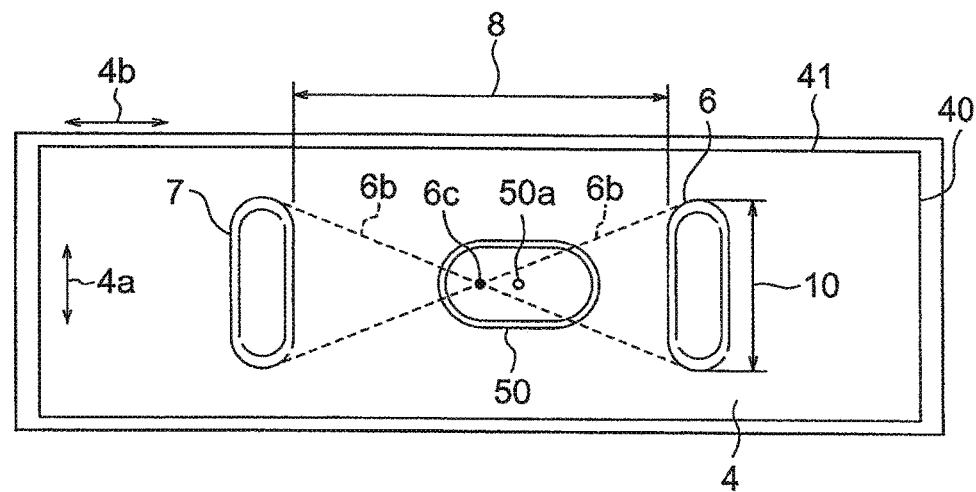
FIG. 5 is a plan view showing a lid for a battery case according to a second embodiment of the present invention.

FIG. 5 is a plan view showing the lid 1 for a battery case according to a second embodiment of the present invention. In the first embodiment, as described above, the intersection 6c between the two line segments 6b linking the respective end portions of the ribs 6, 7 is disposed in alignment with the central position 50a of the annular thin portion 50 (see FIG. 2), whereas in the second embodiment, the annular thin portion 50 is disposed such that the intersection 6c between the line segments 6b is within an inner peripheral region of the annular thin portion 50 but offset from the central position 50a of the annular thin portion 50. Note that the inner peripheral region of the annular thin portion 50 includes the annular thin portion 50 itself as well as an inner side of the annular thin portion 50. All other configurations are similar to the first embodiment.

Next, the operation will be described. When the internal case pressure rises, the peripheral region of the annular thin portion 50 deforms such that the end portions of the ribs 6, 7 form base ends of the deformation, as shown in FIG. 4 and so on. Therefore, by aligning the intersection 6c between the line segments 6b with the central position 50a of the annular thin portion 50, as in the first embodiment, the stress generated when the peripheral region of the annular thin portion 50 deforms is dispersed evenly over the entire annular thin portion 50.

On the other hand, when the annular thin portion 50 is disposed such that the intersection 6c between the two line segments 6b linking the respective end portions of the ribs 6, 7 is offset from the central position 50a of the annular thin portion 50, as shown in FIG. 5, the stress applied to the annular thin portion 50 varies on a gradient in accordance with an offset direction and an offset amount of the offset of the intersection 6c from the central position 50a. The progress of the fracturing of the annular thin portion 50 can be adjusted using this stress gradient.

More specifically, when the annular thin portion 50 is disposed such that the central position 50a is closer to the rib 6 than to the intersection 6c, as shown in FIG. 5, fracturing of the annular thin portion 50 begins from the rib 7 side. By adjusting the offset amount at this time, a majority of the annular thin portion 50 can be made to fracture while ensuring that a part of the annular thin portion 50 remains connected to the lid main body 4. With this configuration, it is possible to prevent the safety valve 5 from falling off the battery case 3 after rupturing.

In this lid 1 for the battery case 3, the annular thin portion 50 is disposed such that the intersection 6c between the two line segments 6b that link the respective end portions of the ribs 6, 7 so as to intersect each other between the ribs 6, 7 is offset from the central position 50a of the annular thin portion 50, and therefore the stress acting on the annular thin portion 50 can be varied intentionally on a gradient. This stress gradient can then be used to adjust the progress of fracturing of the annular thin portion 50.

Third Embodiment

Figure 6:
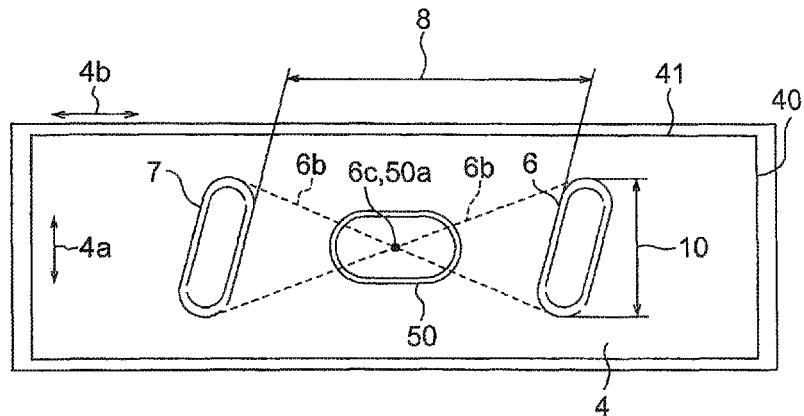
FIG. 6 is a plan view showing a lid for a battery case according to a third embodiment of the present invention.

FIG. 6 is a plan view showing the lid 1 for a battery case according to a third embodiment of the present invention. In the first and second embodiments, the ribs 6, 7 are provided to extend perfectly in the short direction 4a of the lid main body 4. However, as long as the ribs 6, 7 extend in the short direction 4a as a whole, the ribs 6, 7 may be formed in another shape. As shown in FIG. 6, for example, the ribs 6, 7 may be formed such that a long direction of the ribs 6, 7 is tilted relative to the short direction 4a of the lid main body 4.

Hence, even if the ribs 6, 7 are not provided to extend perfectly in the short direction 4a of the lid main body 4, as long as the ribs 6, 7 extend in the short direction 4a as a whole, the ribs 6, 7 can be provided with sufficient rigidity to withstand the deformation of the lid main body 4 that follows an increase in the internal case pressure. Accordingly, deformation in the peripheral region of the annular thin portion 50 can be suppressed, and as a result, the safety valve 5 can be ruptured more reliably.

Note that in the first to third embodiments, only the pair of ribs 6, 7 are described as being provided, but at least one more rib may be provided in parallel with the ribs 6, 7.

Fourth Embodiment

Figure 7:
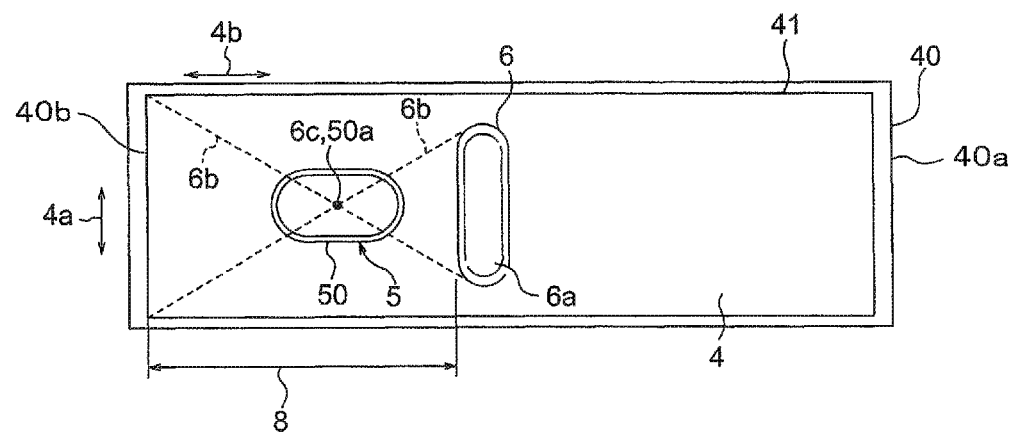
FIG. 7 is a plan view showing a lid for a battery case according to a fourth embodiment of the present invention.

FIG. 7 is a plan view showing the lid 1 for a battery case according to a fourth embodiment of the present invention. In the drawing, the short side 40 of the lid main body 4 includes mutually opposing first and second short sides 40a and 40b. In the first to third embodiments, the annular thin portion 50 is disposed in a substantially central position between the first short side 40a and the second short side 40b in the long direction 4b, but as shown in FIG. 7, the annular thin portion 50 may be disposed in a position that is closer to the second short side 40b than the first short side 40a.

When the annular thin portion 50 is disposed in a position close to the second short side 40b, and the rib 6 is provided parallel to the second short side 40b such that the annular thin portion 50 is sandwiched between the rib 6 and the second short side 40b, deformation in the peripheral region of the annular thin portion 50 can be suppressed by the second short side 40b and the rib 6. When the rib 6 is provided parallel to the second short side 40b such that the annular thin portion 50 is sandwiched between the rib 6 and the second short side 40b, the separation distance 8 between the second short side 40b and the rib 6 is set at no more than 3 W. Further, the annular thin portion 50 is disposed such that the intersection 6c between the two line segments 6b that link respective end portions of the second short side 40b and the rib 6 so as to intersect each other between the second short side 40b and the rib 6 is aligned with the central position 50a of the annular thin portion 50. In other words, in this embodiment, the second short side 40b and the rib 6 that is formed integrally with the lid main body 4 so as to bulge from the lid main body 4 and extends in the short direction 4a of the lid main body 4 are disposed on both sides of the annular thin portion 50 formed following the long direction 4b of the lid main body 4, whereby the second short side 40b exhibits a similar function to the rib 7 according to the first to third embodiments.

Note that in FIG. 7, the annular thin portion 50 is disposed such that the intersection 6c between the two line segments 6b that link the respective end portions of the second short side 40b and the rib 6 so as to intersect each other between the second short side 40b and the rib 6 is aligned with the central position 50a of the annular thin portion 50, but similar to the second embodiment, the annular thin portion 50 may be disposed such that the intersection 6c is offset from the central position 50a. Further, at least one more rib may be provided parallel to the rib 6. All other configurations are similar to the first to third embodiments.

In this lid 1 for a battery case, the second short side 40b and the rib 6 that extends in the short direction 4a of the lid main body 4 are disposed on both sides of the annular thin portion 50 formed following the long direction 4b of the lid main body 4, and therefore, similar to the configurations of the first embodiment and so on, deformation in the peripheral region of the annular thin portion 50 can be suppressed when the internal case pressure rises. Accordingly, excessive stress concentration in a part of the annular thin portion 50 can be avoided, and as a result, the safety valve 5 can be ruptured more reliably.

Note that in the first to fourth embodiments, the ribs 6, 7 are formed to bulge toward the interior of the battery case 3, but the ribs may be formed to bulge toward the exterior of the battery case.

Further, in the first to fourth embodiments, the annular thin portion 50 is described as an elliptical groove, but as long as the annular thin portion has an enclosed outer edge, the outer shape thereof may be circular, polygonal (including a non-point symmetrical shape), and so on. Furthermore, when the annular thin portion is formed in a non-circular shape such as an elliptical shape, for example, the orientation of the annular thin portion may be set as desired. For example, an elliptical annular thin portion similar to that of the first embodiment may be provided at a 90 degree angle rotation relative to the orientation shown in FIG. 1 (i.e. a long axis direction of the annular thin portion may be aligned with the short direction of the lid main body).

Moreover, in the first to fourth embodiments, the metallic sheet constituting the lid 1 is made of stainless steel, but the metallic sheet may be made of another metal such as aluminum, an aluminum alloy, or nickel-plated steel, for example.

The invention claimed is:

1. A lid for a battery case that is formed from a metallic sheet and constitutes a battery case, comprising:
    a lid main body that is formed in a rectangular shape having a short side extending in a first direction along the lid main body and a long side that is longer than the short side and which extends in a second direction along the lid main body transverse to the first direction;
    a safety valve that includes an annular portion formed integrally with the lid main body by coining to form an annular groove in the lid main body that extends about a central portion of the safety valve whereby the annular portion comprises a grooved annular thin portion that is thinner than adjacent portions of the lid main body including the central portion of the safety valve thereof; and
    a pair of ribs formed integrally with the lid main body to be distinct from one another and so as to bulge from the lid main body, extending in the first direction of the lid main body, and spaced from the safety valve including the grooved annular thin portion thereof in the second direction so that one of the pair of ribs is adjacent to and spaced from one side portion of the grooved annular thin portion in the second direction and the other one of the pair of ribs is adjacent to and spaced from another side portion of the grooved annular thin portion in the second direction opposite the one side portion thereof, characterized in that a separation distance between the
  ribs in the second direction is set at no more than 3 W, where W is a length of the short side,
  a rib height of each of the ribs in a sheet thickness direction of the lid main body is set at no less than 1.25 t, where t is a sheet thickness of the lid main body, and
  a rib length of each of the ribs in the first direction is set at no less than 0.6 W.

2. The lid for a battery case according to claim 1, characterized in that the grooved annular thin portion is disposed such that an intersection between two line segments linking respective end portions of the ribs is offset from a central position of the annular thin portion.

3. The lid for a battery case according to claim 1, characterized in that a rib width of each of the ribs in the second direction is set at no less than 1 t.

4. The lid for a battery case according to claim 1, characterized in that the ribs are formed to bulge from the lid main body toward an interior of the battery case.

5. The lid for a battery case according to claim 1, characterized in that the metallic sheet is made of stainless steel.

6. The lid for a battery case according to claim 1, characterized in that a rib width of each of the ribs in the second direction is set at no less than 1 t.

7. The lid for a battery case according to claim 1, characterized in that the grooved annular thin portion is disposed such that an intersection between two line segments linking respective end portions of the ribs is offset from a central position of the annular thin portion.

8. The lid for a battery case according to claim 7, characterized in that a rib width of each of the ribs in the second direction is set at no less than 1 t.

* * * * *